(12) United States Patent
Jain (10) Patent No.: US 8,489,582 B2
(45) Date of Patent: Jul. 16, 2013

(54) INTERCONNECTED, UNIVERSAL SEARCH EXPERIENCE ACROSS MULTIPLE VERTICALS

(75) Inventor: Ashish Jain, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 903 days.

(21) Appl. No.: 12/187,314

(22) Filed: Aug. 6, 2008

(65) Prior Publication Data
US 2010/0036827 A1  Feb. 11, 2010

(51) Int. Cl.
*G06F 7/00* (2006.01)
*G06F 17/30* (2006.01)

(52) U.S. Cl.
USPC ............ 707/722; 707/770; 707/771; 715/700

(58) Field of Classification Search
USPC .. 707/706, 708, 722, 732, 736, 770; 715/700, 715/763, 771, 792, 968
See application file for complete search history.

(56) References Cited

U.S. PATENT DOCUMENTS

| | | | | |
|---|---|---|---|---|
| 5,359,508 A | * | 10/1994 | Rossides | 705/30 |
| 6,131,085 A | * | 10/2000 | Rossides | 705/1.1 |
| 6,993,326 B2 | * | 1/2006 | Link et al. | 455/414.1 |
| 7,680,860 B1 | * | 3/2010 | Fordham | 707/741 |
| 7,747,601 B2 | * | 6/2010 | Cooper et al. | 707/708 |
| 8,117,196 B2 | * | 2/2012 | Jones et al. | 707/731 |
| 8,341,143 B1 | * | 12/2012 | Karls et al. | 707/708 |
| 2005/0222989 A1 | | 10/2005 | Haveliwala et al. | |
| 2006/0242147 A1 | * | 10/2006 | Gehrking et al. | 707/7 |
| 2007/0294240 A1 | * | 12/2007 | Steele et al. | 707/5 |
| 2008/0172374 A1 | * | 7/2008 | Wolosin et al. | 707/5 |
| 2008/0294637 A1 | * | 11/2008 | Liu | 707/6 |
| 2009/0132929 A1 | * | 5/2009 | Reed et al. | 715/739 |
| 2009/0210385 A1 | * | 8/2009 | Ramaswamy et al. | 707/3 |
| 2010/0145800 A1 | * | 6/2010 | Eraker et al. | 705/14.49 |
| 2011/0179078 A1 | | 7/2011 | Boerries et al. | |

OTHER PUBLICATIONS

U.S. Appl. No. 13/078,176, filed Apr. 1, 2011, Final Office Action, Nov. 16, 2011.

* cited by examiner

*Primary Examiner* — Robert Beausoliel, Jr.
*Assistant Examiner* — Susan F Rayyan
(74) *Attorney, Agent, or Firm* — Hickman Palermo Truong Becker Bingham Wong LLP (57) ABSTRACT

One or more query terms that were submitted by a user in connection with a first vertical of a plurality of verticals and not in connection with any other vertical of the plurality of verticals are received. A first set of search results that are both (a) indexed in the first vertical and (b) relevant to the one or more query terms is determined. A second set of search results that are both (a) indexed in a second vertical, but not in the first vertical and (b) relevant to the one or more query terms is also determined. A search results page that contains search results both sets of search results, and that visually distinguishes the sets from each other, is generated. According to one aspect, the results from the second set are shown on the search results page in what appears to be a yellow sticky note.

12 Claims, 5 Drawing Sheets

INTERCONNECTED, UNIVERSAL SEARCH EXPERIENCE ACROSS MULTIPLE VERTICALS

FIELD OF THE INVENTION

The present invention relates to Internet search engines, and, more specifically, to a technique for displaying search results from verticals other than a vertical to which a search query was specifically directed.

BACKGROUND

An abundance of information is available via the Internet. Users can direct web browser applications, such as Mozilla Firefox, to various Uniform Resource Locators (URLs) in order to view content that is associated with those URLs. In order to assist users in locating certain kinds of content for which the users do not know the associated URLs, various Internet search engines have emerged. Yahoo! is the owner and operator of one of these Internet search engines.

A user can enter a set of query terms into an Internet search engine's user interface. The Internet search engine receives the query terms and searches an index for known content items that are associated with the query terms. The Internet search engine creates a list of content items that are relevant to the submitted query terms. The Internet search engine returns the list to the user.

The earliest Internet search engines returned search results from the Internet as a whole, without any regard to any specific categories into which those search results could fit. As Internet search engines evolved, certain content categories, called "verticals," became recognized. Given the set of all content that is accessible via the Internet, a "vertical" is a subset of that content that satisfies some criteria that are associated with that vertical.

For example, one vertical recognized by the Yahoo! Internet search engine is the "images" vertical. The "images" vertical only consists of Internet-accessible images (e.g., files representing visual content in a format such as GIF, JPEG, bitmap, etc.). The "images" vertical excludes all content that is not image content. Regular Hypertext Markup Language (HTML) web pages are excluded from the "images" vertical, although images embedded within such HTML web pages may be included within the "images" vertical.

The Yahoo! Internet search engine allows a user to specify, in addition to a set of query terms, a specific vertical in which the user would like to conduct a search for content. The verticals from which a user of the Yahoo! Internet search engine may select include "web" (which includes all query-term relevant search results unfiltered by any vertical criteria), "video," "images," "local," "shopping," "answers," "audio," "directory," "jobs," and "news." If a user conducts a search using a particular set of query terms in the "web" vertical, then the user might obtain a much larger but much less focused set of search results than if the user conducted the search using the same particular set of query terms in a more specific vertical such as "images." If the user knows at the outset that the user is specifically interested in images that are relevant to the query terms, then the user might be better off conducting the search in the "images" vertical instead of the "web" vertical.

Unfortunately, many users are unaware of and have never searched verticals other than the very broad and inclusive "web" vertical (which is typically the default vertical searched in the absence of the user's express selection of some other vertical). Other than by using a trial-and-error approach in which the user tries submitting the same query terms in each vertical, a user might not be able to ascertain which of the several verticals is most likely to yield search results in which the user is genuinely interested. Most users are unwilling to employ such an approach. As a result, many users miss finding content in which they would be highly interested, and which they might have found had they taken the time and effort to search a specific vertical.

Different verticals may be associated with different URLs to which a user might direct his browser in order to access that vertical directly. For example, a "local" vertical might be associated with the URL "local.yahoo.com," while a "real estate" vertical might be associated with the URL "real-estate.yahoo.com," while a "jobs" vertical might be associated with a URL "hotjobs.yahoo.com." Some users might be aware of the URLs for specific verticals, but unaware that the other verticals even exist. Such a user might not know that if he is looking for a job, it would be better to direct his browser to "hotjobs.yahoo.com" than to "local.yahoo.com." However, if such a user has only previously experienced and dealt with "local.yahoo.com," then that user might not even know that "hotjobs.yahoo.com" exists. Consequently, when the user submits, into the query term field at "local.yahoo.com," query terms that describe a job that the user is seeking, the user might not get any truly relevant results at all. Thus, even if there are abundant relevant job listings, which the user might have found had he entered the same query terms at "hotjobs.yahoo.com," the user might not receive any relevant search results about such jobs, because few or none of those jobs might be indexed in the "local" vertical. The user may come to believe that the lack of pertinent results is the fault of the search engine, when the fault actually lies with the user's choice of vertical in which to conduct the search.

People who are selling products and services often would like to advertise those products and services on the Internet. Sometimes, these people approach search engine companies and enter into agreements to pay the search engine companies money in exchange for having the search engine companies show those peoples' advertisements in conjunction with search results that have been obtained from the web as a whole (rather than any specific vertical). Thus, when someone submits query terms for a search of the web as a whole, the search engine determines whether any advertisements are relevant to the query terms, and, if so, displays at least some (but a limited number) of the relevant advertisements, along with the search results, to the person who submitted the query terms. Unfortunately, it can be very expensive to have an advertisement displayed, even once, in conjunction with search results that are gathered from all over the web. Competition to have advertisements displayed with search results gathered from the web as a whole is quite keen, and typically only advertisements associated with a few highest bidders are ultimately presented with any set of those search results. Often, this expense is so significant that common people (in contrast to large corporations) decide that they cannot afford to have their advertisements displayed by a search engine.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Various embodiments of the present invention are illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

According to techniques described herein, an Internet search engine receives user-submitted query terms that the user submitted in a specific vertical (whose scope is less than the entire web). The specific vertical in which the query terms are submitted typically relates to a specific topic or category such as "local," "shopping," "jobs," etc. Often, the specific vertical has its own URL that is separate from the URL to which the user would direct his browser if the user wanted to search the entire web rather than the specific vertical only.

In response to receiving the query terms submitted in the specific vertical, the Internet search engine determines a set of relevant (to the query terms) search results that are obtained only from the specific vertical, and displays them to the user, as usual. However, in addition to the search results that were obtained from the specific vertical, the search engine additionally selects one or more other verticals—verticals other than the one in which the user submitted the query terms—and determines one or more relevant (to the query terms) search results from these other verticals also. In addition to the search results from the specific vertical in which the query terms were submitted, the search engine displays one or more relevant search results obtained from the other verticals.

In one embodiment of the invention, the search engine displays the search results obtained from the other verticals in a manner that visually distinguishes those search results from the search results obtained from the specific vertical in which the query terms were submitted, so that the user can tell that the search results obtained from the other verticals were not obtained from the specific vertical in which the user submitted the query terms. More specifically, in one embodiment of the invention, the search engine displays the search results obtained from the other verticals within a sub-area to the side of the main search result listing. In one embodiment of the invention, this sub-area has the appearance of a yellow adhesive sticky note on which at least a few of the search results from the other verticals are printed.

Beneficially, the techniques described herein expose users to verticals other than those with which they might be familiar. The techniques described herein essentially allow the owner of the Internet search engine to "cross sell" the verticals, so that search results from less frequented verticals get more exposure than they otherwise would. Users who mistakenly restrict their search queries to a specific vertical with which they are familiar are nevertheless rewarded with relevant search results from other verticals that might have been more appropriate venues for the submission of those search queries. Indeed, techniques described herein help to introduce users to other verticals about which the user might not previously have known, thereby potentially increasing the future use of those other verticals. Because users are rewarded with more relevant results, they are likely to use the same Internet search engine for future searches, thereby increasing the revenue of the engine's owner (who can provide prospective advertisers with statistics that show that their advertisements will be exposed to a greater number of users).

Additionally, because results from various verticals get more exposure, common people have more incentive to submit listings for their products and services in verticals that traditionally have not been accessed as often as others. This increased incentive to submit listings and advertisements, for whose submissions the Internet search engine's owner can charge a fee, also potentially adds to the revenues of the Internet search engine's owner. Due to techniques described herein, common people, who previously would have been discouraged from trying to sell their products and services via a search engine property, become encouraged that their products and services can indeed be exposed, in verticals, to a significant number of prospective buyers, and for a fee that is significantly less than that which they would have had to bid in order to compete with a large corporation.

Figure 1:
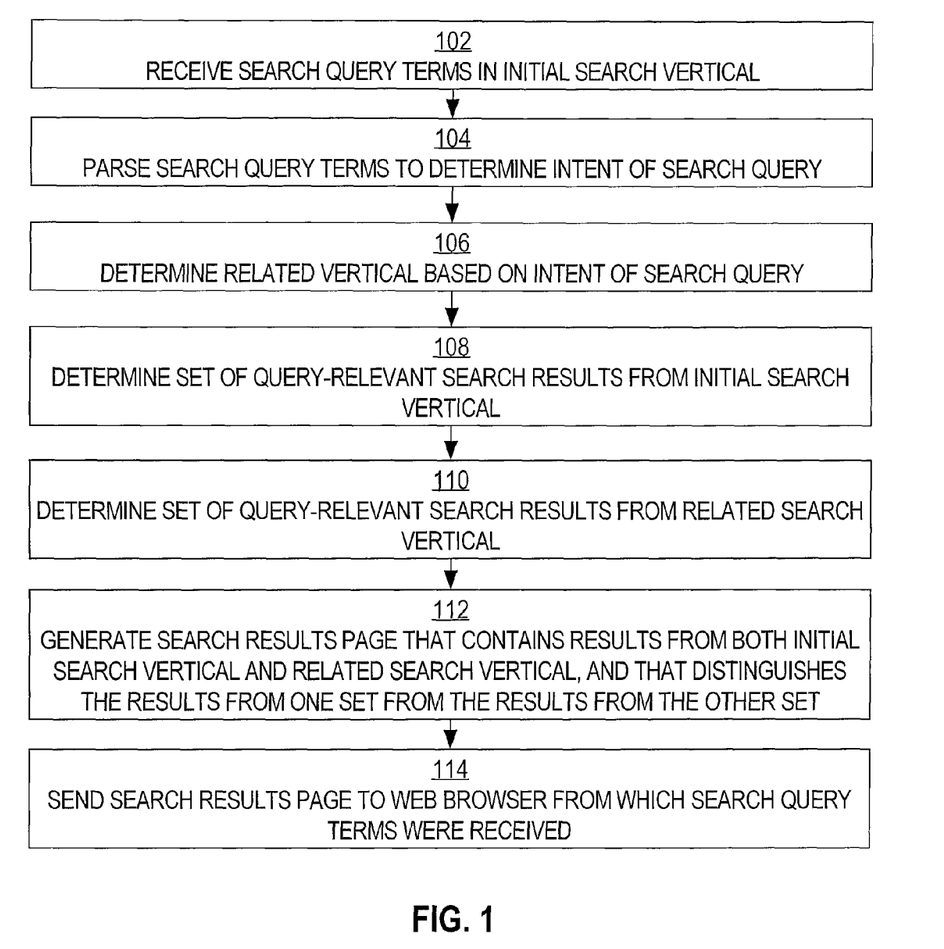
FIG. 1 is a flow diagram that illustrates an overview of a technique for displaying, along with search results determined from a particular vertical in which a search query was submitted, a "Post-It" note graphic that shows relevant results from a vertical other than particular vertical, according to an embodiment of the invention.

Discovering and Showing Results from Related Verticals in a "Post-It" Note on a Search Results Page FIG. 1 is a flow diagram that illustrates an overview of a technique for displaying, along with search results determined from a particular vertical in which a search query was submitted, a "Post-It" note graphic that shows relevant results from a vertical other than particular vertical, according to an embodiment of the invention. Alternative embodiments of the invention may involve more, fewer, or different steps than those illustrated in FIG. 1.

In block 102, a search engine receives one or more search query terms from a user through a user interface that is connected specifically with a particular search vertical (which is typically one of several different search verticals). In the discussion below, the search vertical in which the search query terms are submitted will often be referred to as the "particular vertical." Typically, a web server associated with the search engine sends the user interface in the form of a web page to the user's web browser (e.g., Mozilla Firefox) over the Internet. The user's web browser displays the user interface, including a field into which the user can enter the search query terms. Usually, the web page that the web server sends to the user's web browser is uniquely associated with a specific URL—more specifically, the URL that is uniquely associated with the particular search vertical. For example, if the particular vertical in which the user wants to submit query terms is the "local" vertical, then the user will most likely direct his web browser to a URL that is uniquely associated with the "local" vertical (and no other vertical). Under such circumstances, the web page that the web server responsively returns to the user's web browser is a web page that is associated with the "local" vertical. After the user submits the search query terms via the field in the web page, the web server forwards the search query terms to the search engine.

In block 104, the search engine parses the search query terms in order to determine an "intent" or "context" of the search query terms. In one embodiment of the invention, the search engine automatically determines the "intent" or "context" of the search query terms by locating, in a human-constructed "term tree" of the particular vertical in which the search query terms were submitted, a most specific "leaf" node that specifies the greatest number of terms that are also specified in the search query. For example, a "term tree" for a particular vertical might have a root node and multiple levels of descendant nodes, ultimately terminating in multiple leaf nodes, each of which specifies one or more terms (the root node and non-leaf nodes also may specify terms, but typically in a less specific manner than the leaf nodes do). Different verticals may have different associated "term trees." In order to determine the "intent" or "context" of the search query terms, the search engine may locate, in the "term tree" for the particular vertical, the leaf node that specifies the greatest number of terms that are all also contained in the search query. For example, if one leaf node specified three terms that were all in the search query, but another leaf node specified four terms that were all in the search query, then the search engine would choose the leaf node that specified four terms over the leaf node that specified three terms. In one embodiment of the invention, if there is no leaf node that specifies terms that are all also contained in the search query, then the search engine locates, instead, a non-leaf node that contains terms that are all also contained in the search query. The node located (and selected) by the search engine is the node that most specifically reflects the "intent" or "context" of the user-submitted search query. In one embodiment of the invention, the search engine may select, from the "term tree" for the particular vertical, more than one node that contains matching terms—under such circumstances, the search query would be said to have multiple intents or contexts. For sake of simplicity, the discussion below deals with the case in which only one "intent" or "context" of the search query terms is identified, although the techniques described herein clearly can be extended to cover cases in which a search query has multiple different intents.

According to one embodiment of the invention, each (or at least some) of the nodes in each vertical's associated "term tree" are bidirectionally linked to related nodes in other verticals' associated "term trees." For example, if the terms specified in a node in one vertical's term tree are identical, or synonymous with, the terms specified in another node in another vertical's term tree, then a cross-vertical bidirectional link may be established between those nodes. Given a set of terms trees for different verticals, such bidirectional links may be manually and/or automatically established. For example, a computer program may automatically establish such links by comparing the terms of each node in each tree with the terms of each node of each other tree. The computer program may determine synonyms for terms in a node by referring to data gathered from a thesaurus, for example. Thus, a node in the "local" vertical's term tree—a node which specifies the terms "car dealership"—may become bidirectionally linked with a node in the "automotive" vertical's term tree—a node which specifies the terms "auto dealership," which, while not strictly identical, are at least partially synonymous. The purpose (in one embodiment of the invention) for such cross-vertical bidirectional links will become clear from the discussion that follows.

In block 106, the search engine determines one or more related verticals, other than the particular vertical, based on the "intent" or "context" of the search query terms, determined as discussed above. In one embodiment of the invention, the search engine determines the one or more related verticals using the cross-vertical bidirectional links discussed above. The search engine may determine the one or more related verticals by following the links from the most specific context-specifying node (referred to herein as "the particular node") in the particular vertical's term tree to the other nodes (in other verticals' term trees) to which the particular node links. The verticals that are associated with the term tree that contains the other nodes to which the particular node links are determined to be the related verticals. Although there may be more than one related vertical, for purposes of simplicity, the discussion below deals with the case in which only one related vertical is discovered.

In block 108, the search engine determines a set of "initial vertical" search results based on the search query terms. In order to do this, the search engine locates one or more Internet-accessible resources (e.g., web pages) that are both (a) indexed in and associated with the particular search vertical and (b) determined to be relevant to the search query terms. Thus, the set of "initial vertical" search results only contain relevant search results from the particular vertical. The relevance of a web page to the search query terms is typically based on many factors, including whether that web page contains the search query terms (and how many of the search query terms the web page contains). Each search result in the set of "initial vertical" search results is ranked and ordered based on relevance, with the most relevant results being ranked higher than less relevant results.

In block 110, the search engine additionally determines a set of "related vertical" search results based on at least some of the search query terms. In one embodiment of the invention, the search engine omits, from the search query terms used to determine the "related vertical" search results, any search query terms that identically or synonymously matched with the terms specified by the "particular node" (discussed above) in the particular vertical's term tree (e.g., if the search query terms were "Sunnyvale Java jobs," and if the term "jobs" was the term that was also specified in the "particular node"—thus resulting in the determination of the "intent" of the search query—then only the remaining query terms "Sunnyvale Java" might be used to determine the "related vertical" search results). In one embodiment of the invention, in order to determine the set of "related vertical" search results, the search engine locates one or more Internet-accessible resources (e.g., web pages) that are both (a) indexed in and associated with the related search vertical (in contrast to the "particular" search vertical in connection with which the search query terms were originally submitted) and (b) determined to be relevant to the search query terms. Thus, the set of "related vertical" search results only contain relevant search results from the related vertical. Each search result in the set of "related vertical" search results is ranked and ordered based on relevance, with the most relevant results being ranked higher than less relevant results.

In block 112, the search engine generates a search results page that contains both (a) at least some search results from the set of "initial vertical" search results and (b) at least some search results from the set of "related vertical" search results.

Typically, a subset of the most highly ranked search results from each set are selected for inclusion in the search results page. In one embodiment of the invention, the search results from the "initial vertical" set are visually distinguished and segregated from the search results from the "related vertical" set, so that the results from each are not confused with each other, and so that it is clear to a user from which vertical each of the search results came. More specifically, in one embodiment of the invention, the search results from the "initial vertical" set are listed in the usual manner in which search results are listed in a search results page, with the most relevant results occupying the upper portion of the page and the less relevant results following below, and with the search results from that set dominating the majority of the search results page—typically, leaving a column (usually smaller in area than the area in which the "initial vertical" search results are placed) to the right side of the page in which other information may be placed. In such an embodiment of the invention, a graphic which visually resembles a square yellow adhesive paper note (or, in other words, a "Post-It" note) is displayed in this column on the right side of the page. This graphic contains a subset of the most highly ranked search results from the "related vertical" set, as though that subset of results were written upon the note. Concerning the search results from both the "initial vertical" and "related vertical" sets, selected information from the actual resources (e.g., web pages) to which those search results correspond may be shown rather than the entire resources (which, due to space constraints, typically cannot be fully shown). For example, for each search result selected for inclusion in the search results page, a title and brief abstract, or even a title alone, may be placed in the search results page for that search result. Each search result may contain a hyperlink, which, when clicked or otherwise selected by a user of the web browser that will display the search results page, directs the web browser to the URL of the resource (e.g., web page) to which that search result corresponds. The actual URL for a search result might or might not be visually placed with that search result in the search results web page. In generating the search results page, the search engine typically at least temporarily stores, in a volatile memory (e.g., RAM) and/or non-volatile memory (e.g., hard disk drive) of a computer, the data that represents the contents of the search results page.

In one embodiment of the invention, if there is more than one related vertical (as may be the case when the particular context-specifying node in the particular vertical's term tree links to nodes in more than one other vertical's term tree), then the search engine generates a search results page in which a separate note for each related vertical is placed in the right-side column discussed above (although, in various different embodiments of the invention, such notes may be placed in various location on the search results page). In such an embodiment of the invention, each such note contains search results only from one related vertical (not from any other verticals), and each such note contains search results from a different vertical. In one embodiment of the invention, each such note is initially displayed in a "collapsed" manner, such that the area occupied by the note on the search results page is initially smaller than usual, and such that, when that note is clicked on or otherwise selected by a user, that note responsively "expands" to occupy the usual area of the search results page and to show the contents contained therein (which might be only partially visible or entirely invisible while the note is in its "collapsed" state).

Although a limited subset of the most relevant search results from a related vertical may be initially placed in the graphical note discussed above, in one embodiment of the invention, each graphical note additionally contains a link or other user-selectable control labeled "show me more" (or some text conveying similar meaning) which, when clicked or otherwise selected by a user, causes the user's web browser to display further, previously undisplayed, relevant search results from that related vertical. Such further results may be placed in a "hidden" manner in the original search results page, and presented visibly in response to the selection of the link. Alternatively, the selection of the link may cause the user's web browser to request and receive the further results from the web server that is associated with the search engine.

In block 114, the search engine sends the generated search results page over the Internet to the web browser of the user who initially submitted the search query terms relative to the particular vertical. The user's web browser receives and renders the search results page, thereby displaying the search results page to the user. Thus, the user sees not only search results from the particular vertical relative to which the user submitted the search query terms, but also search results from the related vertical(s), relative to which the user did not submit the query terms. Thus, the user may see results, and more relevant results, than he would have seen if the results from the related verticals had not been displayed. The results from the related verticals actually may be more interesting to the user than the results from the particular vertical in which the user originally submitted the search query terms. Indeed, the user might not have even been aware that the related verticals existed—one beneficial consequence of the techniques described above is the exposure of a searching user to other lesser-known verticals about which the user might never have been aware. After becoming aware of these lesser-known verticals, the user might be prompted to submit more search queries relative to those lesser-known vertical in the future, thus causing the lesser-known verticals to become better known and more utilized. However, at the same time, the user is not forced to remember the related verticals if he would prefer not to—if the user chooses to submit the same query in the "particular" well-known vertical in the future, then the user will still likely see relevant search results from the same related verticals. The user does not need to alter his searching habits or his choice of verticals in order to obtain relevant results from a broader variety of verticals. The user does not need to remember a multitude of different URLs for different verticals' search query entry pages.

Example Search Result Pages

Figure 2:
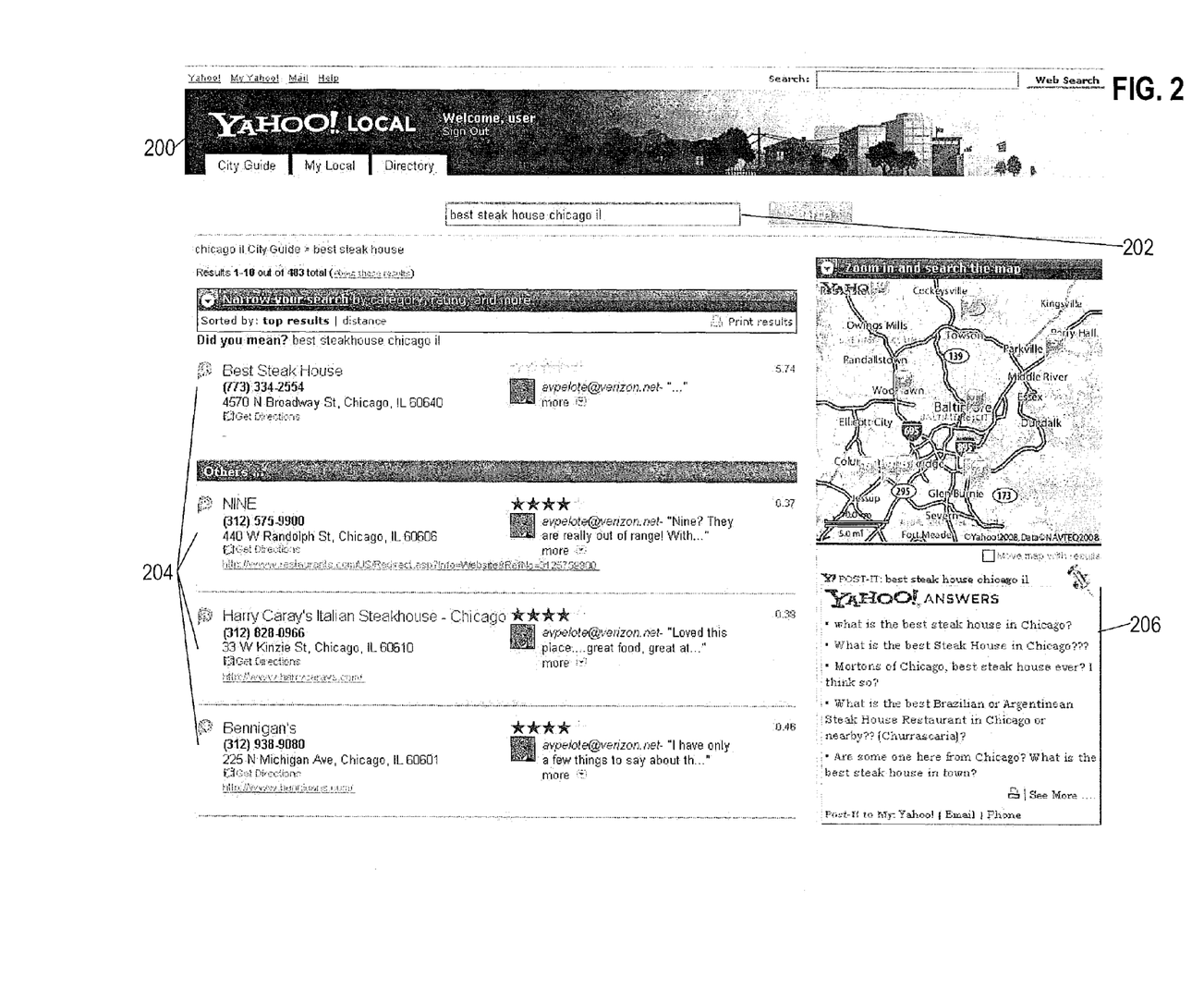
FIG. 2 shows an example of a search results page that contains a graphical note on which is "printed" a set of search results from a related vertical, according to an embodiment of the invention.

FIG. 2 shows an example of a search results page 200 that contains a graphical note on which is "printed" a set of search results from a related vertical, according to an embodiment of the invention. Search results page 200 shows the text entry field 202 into which the user submitted the search query terms (and through which the user may submit different search query terms if the user chooses to do so). As can be seen, in this example, the search query terms that the user submitted to the search engine were "best steak house chicago Ill." As is apparent from the prominent header of search results page 200, these search query terms were submitted to the initial vertical "local." Search results page 200 contains "initial vertical" search results 204, which were gathered from resources that had been indexed specifically in the "local" vertical. These are displayed prominently and dominantly on the left side of search results page 200. However, search results page 200 also displays, less prominently in the right-side column, a graphical note 206 of the kind discussed above. Graphical note 206 (which visually resembles a "Post-It" note) contains "related vertical" search results that not from the initial vertical "local." In this example, the "related vertical" search results are from an "answers" vertical, which contains Internet community-submitted questions and answers (the reader is referred to Yahoo! Answers on the Internet for further information about this vertical). Like the "initial vertical" search results 204, the "related vertical" search results in graphical note 206 have high relevance to at least some of the user-submitted query terms. Search results in the graphical note 206 probably would not have been discovered by the user who submitted the search query terms if graphical note 206 had not been displayed, because these search results were not directly indexed in the "local" vertical relative to which the user submitted the search query terms.

Figure 3:
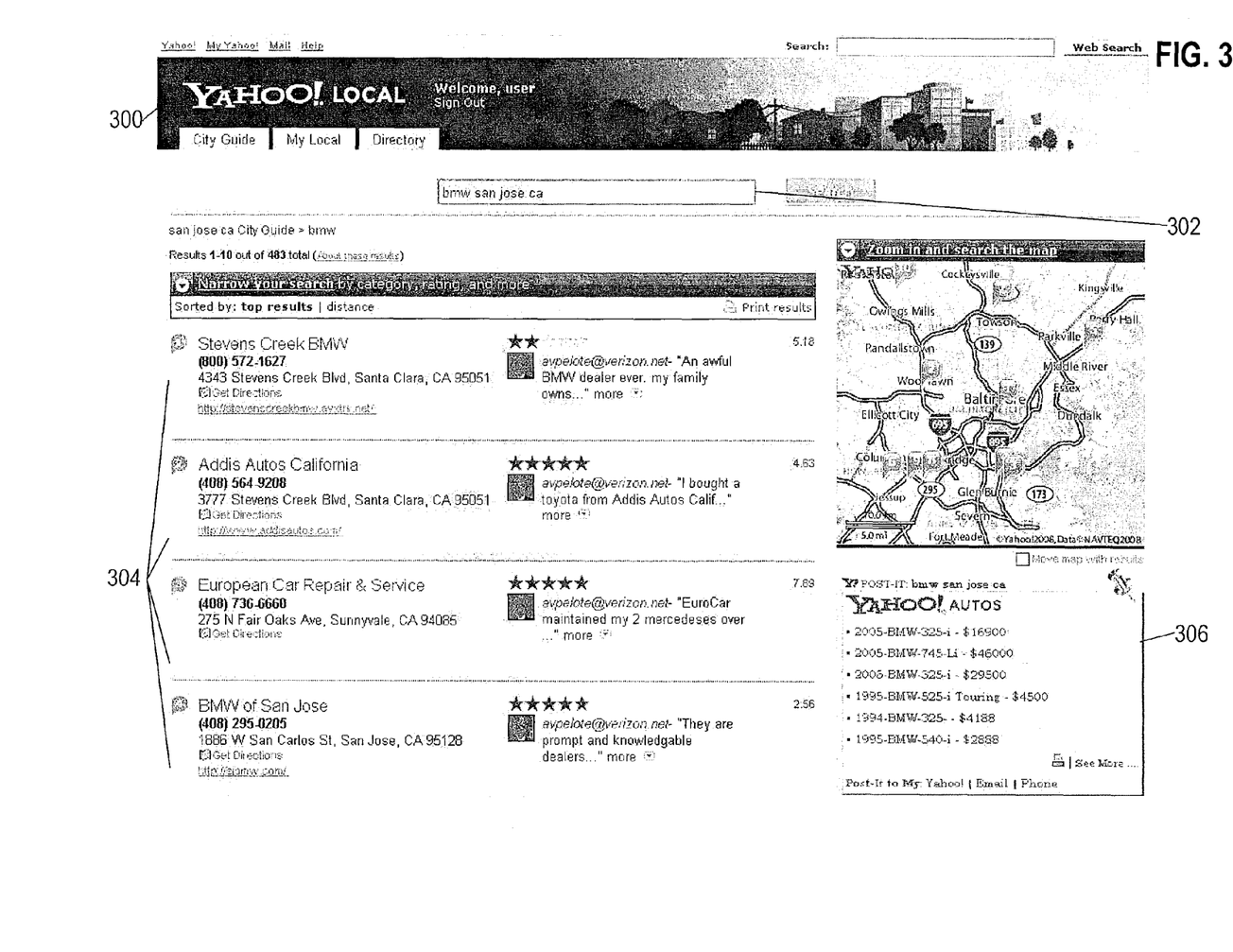
FIG. 3 shows an example of another search results page that contains a graphical note on which is "printed" a set of search results from a related vertical, according to an embodiment of the invention.

FIG. 3 shows an example of another search results page 300 that contains a graphical note on which is "printed" a set of search results from a related vertical, according to an embodiment of the invention. Search results page 300 shows the text entry field 302 into which the user submitted the search query terms. As can be seen, in this example, the search query terms that the user submitted to the search engine were "bmw san jose Calif." As is apparent from the prominent header of search results page 300, these search query terms were submitted to the initial vertical "local." Search results page 300 contains "initial vertical" search results 304, which were gathered from resources that had been indexed specifically in the "local" vertical. These are displayed prominently and dominantly on the left side of search results page 300. However, search results page 300 also displays, less prominently in the right-side column, a graphical note 306 of the kind discussed above. Graphical note 306 (which visually resembles a "Post-It" note) contains "related vertical" search results that not from the initial vertical "local." In this example, the "related vertical" search results are from an "autos" vertical, which contains Internet community-submitted listings for automobiles that are on sale (more on the topic of exposing listings submitted by individual users, and how this can be monetized, are discussed further below). Each listing names the year, make, and model of an automobile that is for sale, along with the sale price asked by the seller of that automobile. Like the "initial vertical" search results 304, the "related vertical" search results in graphical note 306 have high relevance to at least some of the user-submitted query terms. Search results in the graphical note 306 probably would not have been discovered by the user who submitted the search query terms if graphical note 306 had not been displayed, because these search results were not directly indexed in the "local" vertical relative to which the user submitted the search query terms.

Figure 5:
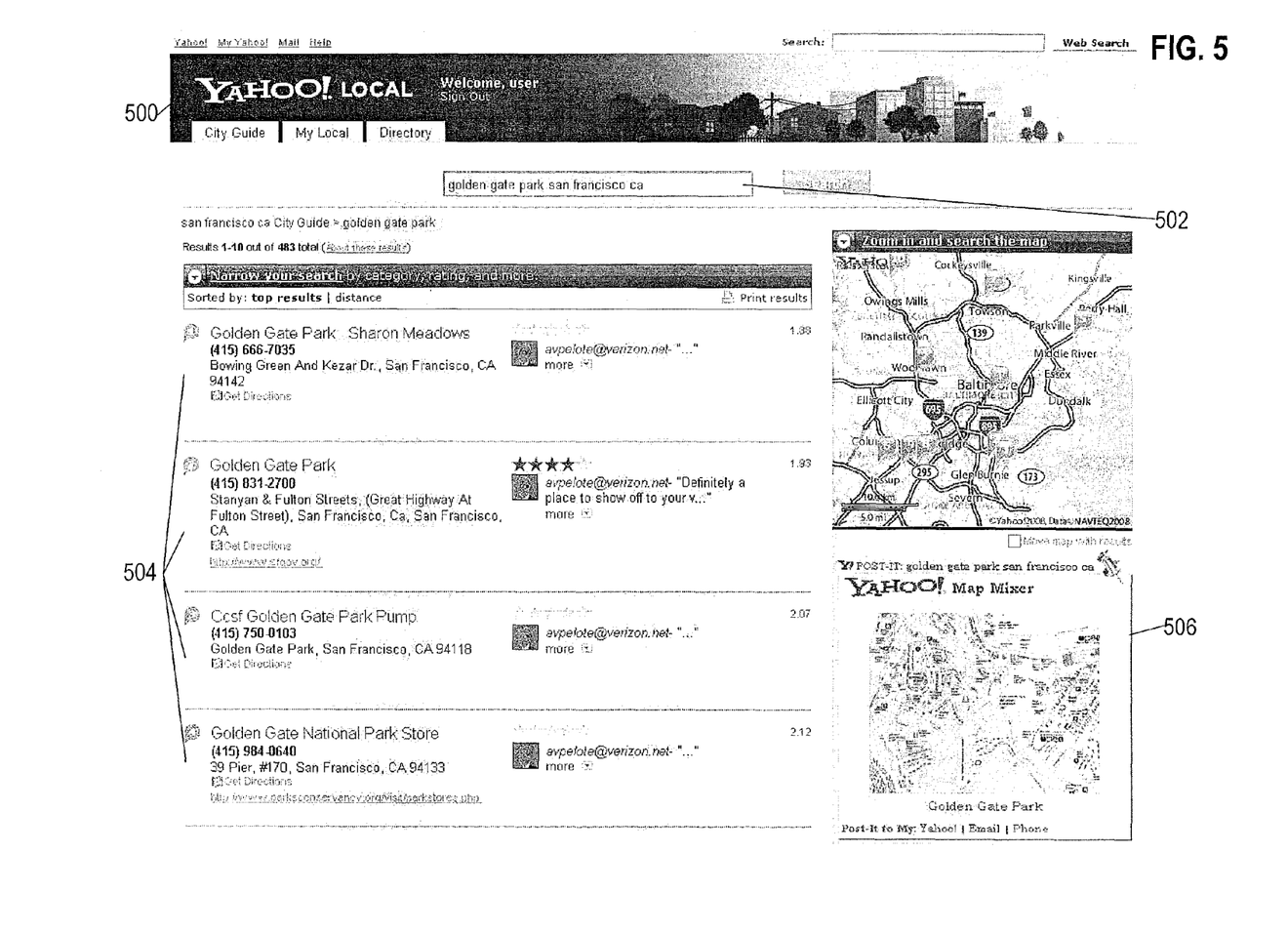
FIG. 5 shows an example of another search results page that contains a graphical note on which a related map is "printed," according to an embodiment of the invention.

FIG. 5 shows an example of another search results page 500 that contains a graphical note on which a related map is "printed," according to an embodiment of the invention. In the example illustrated, the experience of the searching user is enhanced by showing, with the search results on the search results page, non-textual information that is related to the user's query. There is no limitation on the kind of query-relevant information that could be displayed in a "note" on the search results page. For example, the "note" may contain a query-relevant layout map, a query-relevant blueprint, and/or a query-relevant business image. All such information may come from sources other than the resources (e.g., web pages) that are indexed in the vertical relative to which the user submitted the original query terms. This provides the user with a comprehensive end-to-end user experience, and negates the need for the user to look at multiple different sources for query-relevant information. Search results page 500 shows the text entry field 502 into which the user submitted the search query terms. As can be seen, in this example, the search query terms that the user submitted to the search engine were "golden gate park san francisco ca." As is apparent from the prominent header of search results page 500, these search query terms were submitted to the initial vertical "local." Search results page 500 contains "initial vertical" search results 504, which were gathered from resources that had been indexed specifically in the "local" vertical. These are displayed prominently and dominantly on the left side of search results page 500. However, search results page 500 also displays, less prominently in the right-side column, a graphical note 506 of the kind discussed above. Graphical note 506 (which visually resembles a "Post-It" note) contains a map generated by a "map mixer" application which is associated with the initial vertical "local." The map is of "golden gate park," which is relevant to the query terms.

Exposing Listings Submitted by Individual Users

As is discussed above, due to the immense cost of having advertisements displayed along with search results that are gathered from the Internet as a whole (and not relative to any specific vertical), individual users are discouraged, and practically excluded, from having their salable products and services advertised or exposed to others through a search results page produced by a popular Internet search engine. Typically, the only customers who have been able to afford to have their advertisements or "sponsored results" displayed in conjunction with general search results presented on a search results page have been large corporations with deep financial resources. It has been unfortunate that the "little guy" has, up to this time, largely been unable to advertise his products and services on a search results page that is likely to be seen by a large quantity of searching users. It is also somewhat unfortunate that, up to this time, advertising opportunities on search result pages for searches conduced in lesser-known verticals have largely been ignored, typically because large corporations have been uninterested in exposing their salable products and services to the relatively lesser number of users who submit search queries relative to those lesser-known verticals.

However, according to one embodiment of the invention, individuals (in contrast to large corporations) are enabled to have their salable products and services exposed to a significant quantity of searching users through the techniques discussed above. As is shown in FIG. 3, graphical note 306 contains listings of automobiles for sale. Each of these listings was potentially submitted to the "auto" vertical by a different individual. Even though the searching user has conducted his search relative to the relatively popular and well-known "local" vertical (in which such automotive listings would not normally be indexed), the searching user is still exposed, through the techniques discussed herein, to the query term-relevant listings from the less popular and lesser-known "autos" vertical. Thus, through techniques discussed herein, individual users are given a mechanism for exposing their salable products and services to searching users who otherwise probably would not be exposed to those products and services.

According to one embodiment of the invention, the presentation of listings submitted by individual users provides an opportunity for the search engine owner to obtain financial gain that previously has gone unexploited. In one embodiment of the invention, the search engine owner enters into a legal agreement with the individual who submits the vertical-specific listing (such as a listing for a car that is on sale). The legal agreement states that the listing will be displayed for free in response to other users' queries that are submitted in the same vertical in which the listing was submitted, as long as the listing is sufficiently relevant to those queries. Additionally, the legal agreement states that, in exchange for a specified sum of money or other consideration received from the individual who submits the vertical-specific listing, the search engine will additionally present the listing (up to a specified number of times) in response to queries that are submitted in related verticals other than the vertical in which the listing was submitted, as long as the listing is sufficiently relevant to those queries. For example, the legal agreement may state that for a sum of one dollar received from the individual submitting the listing, the search engine will display the listing up to ten times in graphical notes on search results pages that contain search results from verticals other than the vertical in which the listing is specifically submitted. For another example, the legal agreement may state that for a sum of five dollars received from the individual submitting the listing, the search engine will display the listing up to sixty times in graphical notes on search results pages that contain search results from verticals other than the vertical in which the listing is specifically submitted. Thus, in one embodiment of the invention, as the sum of money that the individual is willing to initially pay to the search engine's owner increases, the cost per display of the listing on a search results page decreases (e.g., 10 cents for exposure when 10 exposures are initially purchased, but only 8.4 cents per exposure when 60 exposures are initially purchased).

Thus, search engine owners are given an opportunity, using the techniques described herein, to derive financial revenue from a segment of the Internet-using population from which search engine owners previously did not obtain any significant monetary returns. In addition to gaining a few large quantities of money from a few large corporations, the search engine owner can also gain many small quantities of money from many individuals. The latter amount may, in aggregate, even exceed the former amount. Additionally, individuals who are less financially endowed than large corporations can still expose their salable products and services (and even other personal interests, such as dating solicitations) to a significant segment of the search engine-using population at a price that is within those individuals' reach.

Deriving Revenue from External Sites

As is discussed above, a search engine may have resources from all over the Internet indexed into various verticals that the search engine maintains. However, other web sites, unrelated to the search engine's web site, may contain a rich set of listings that are not specifically associated with any of the search engine's verticals. Through techniques discussed below, the owners of these other web sites are enabled to have the listings from their web sites exposed as though their web sites were verticals maintained by the search engine, while, in exchange for providing this exposure, the search engine's owner is enabled to gain financial revenue from those web sites' owners.

In one embodiment of the invention, a web site owner enters into a legal agreement with the search engine owner. The legal agreement states that the web site owner will provide the search engine owner with a specified amount of money or other valuable consideration. The legal agreement further states that, in exchange for this valuable consideration, the search engine will treat the information on the web site owner's web site as though it were a vertical maintained by the search engine. Thus, in one embodiment of the invention, when such a legal agreement has been entered into, the search engine not only determines which other verticals contain results that are relevant to the "intent" of the query terms, but additionally determines whether there are any listings on the web site owner's web site that are relevant to the "intent" of the query terms. In such an embodiment of the invention, if there are query-relevant listings on the web site owner's web site, then the search engine places, on the search results page, a graphical note that is reserved specifically for containing relevant listings from that web site. The search engine searches the web site for query term-relevant listings, ranks those listings by query term relevance, and places a most highly ranked subset of those listings in the reserved graphical note.

Preserving Results for Later Use

On occasion, a user might find a particular set of search results in which he is keenly interested. However, the user might not have much time, when he finds that set of search results, to investigate that set of search results in as thorough a manner as he would like. Therefore, in one embodiment of the invention, the search results page includes a user-selectable mechanism through which the user can cause the contents of the graphical note (and/or other search results from the "related vertical" that are not contained in the graphical note) to be preserved in a more permanent medium so that the user can revisit those results at a later time—without needing to recall which query terms the user entered to get the search results, and without needing to recall from which related vertical the search results came, and without needing to recall the initial vertical relative to which the user submitted the search query terms.

In one embodiment of the invention, the graphical note contains a link or other selectable control which, when selected by the user, causes the user's computer to post the contents of the graphical note to a "personal space" vertical on the Internet. This vertical contains materials that the user has decided to store. For an example of such a vertical, the reader is encourage to visit "My Yahoo!" on the Internet. This technique has the further advantage of exposing and promoting the "personal space" vertical that is maintained by the search engine—such a vertical might not be initially known to a significant segment of the search engine's users.

In one embodiment of the invention, the graphical note contains a link or other selectable control which, when selected by the user, causes the user's web browser (or other application) to request a telephone number or other identity of a text-capable mobile device (such as one of the several popular mobile cellular telephones which are commercially available today). In response to receiving the telephone number or other identity, the web browser (or other application) sends a text message (or other message) to the identified mobile device. The message contains the contents of the graphical note, including links from the search results therein to the complete Internet resources (e.g., web pages) to which those search results correspond. For example, such a message may be sent using the Short Message Service (SMS) protocol. As a result, the contents of the graphical note may be preserved on the identified mobile device.

In one embodiment of the invention, the graphical note contains a link or other selectable control which, when selected by the user, causes the user's web browser (or other application) to request an e-mail address. In response to receiving the e-mail address, the web browser (or other application) sends an e-mail message to the specified e-mail address. The message contains the contents of the graphical note, including links from the search results therein to the complete Internet resources (e.g., web pages) to which those search results correspond. As a result, the contents of the graphical note may be preserved in the specified e-mail account.

In one embodiment of the invention, the graphical note contains a link or other selectable control which, when selected by the user, causes the user's web browser (or other application) to sent data to a printing device. In response to receiving the data, the printing device prints the data on one or more sheets of media (e.g., paper, transparencies, etc.). The data contains the contents of the graphical note. As a result, the contents of the graphical note may be preserved on one or more sheets of media. Indeed, the contents of the graphical note might even be printed on an actual physical yellow adhesive note that resembles the graphical note in appearance.

Hardware Overview

Figure 4:
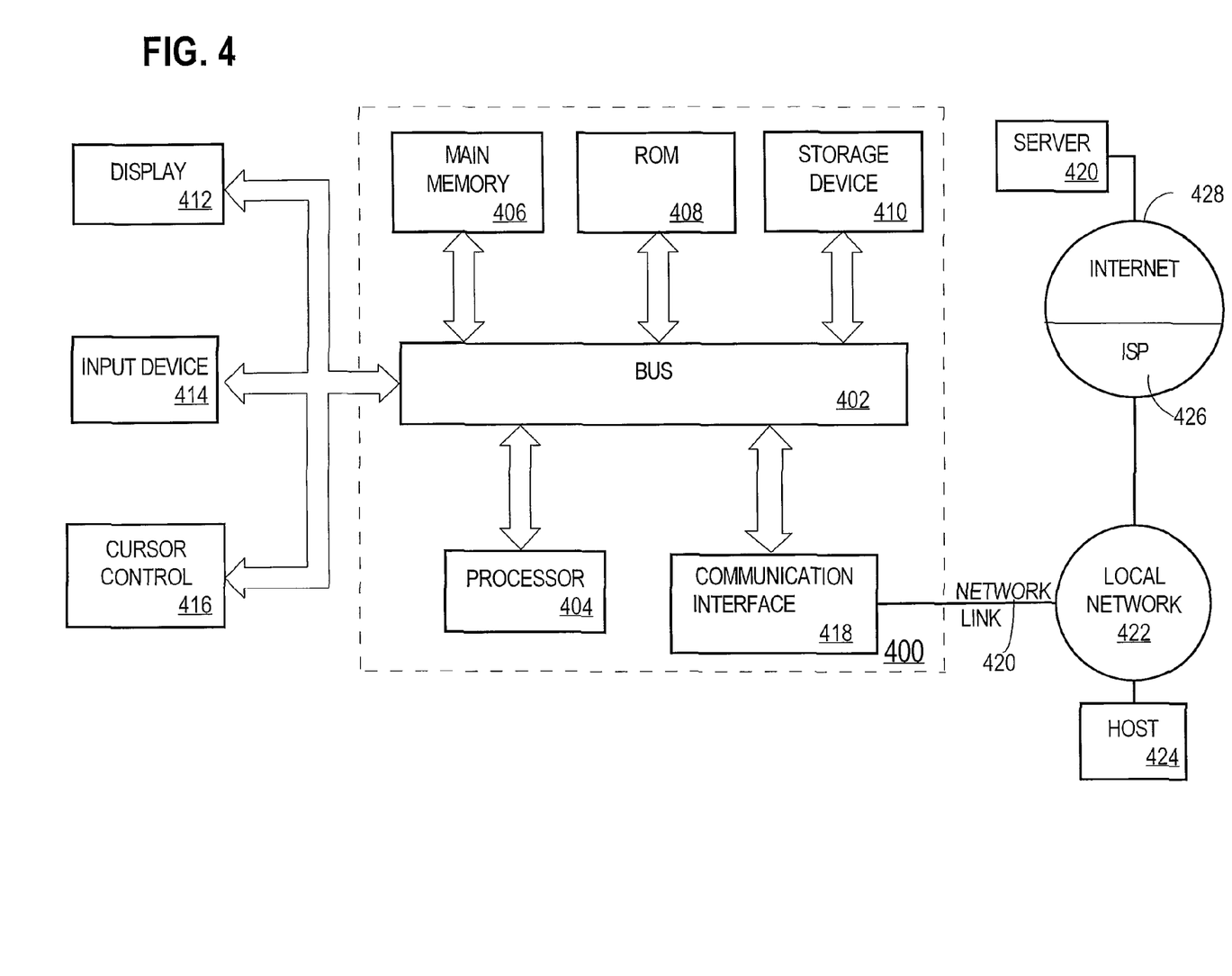
FIG. 4 is a block diagram that illustrates a computer system upon which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to storage media and transmission media. Storage media includes both non-volatile media and volatile media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising:
   receiving one or more query terms through a search engine interface;
   determining, by a first party, a first set of search results that are both (a) indexed in a first vertical and (b) relevant to the one or more query terms;
   based on a legal agreement entered into between (a) the first party that is associated with a search engine that determines the first set of search results and (b) a second party that owns a web site that comprises a set of listings submitted to the web site by various users other than the second party over the Internet, receiving, by the first party, the set of listings;
   determining, by the first party, a second set of search results at least in part by determining one or more listings, from the set of listings, that are relevant to the one or more query terms;
   wherein the determining a second set of search results includes ranking, by the first party, the one or more listings based on the one or more query terms;
   generating a search results page that contains both (1) one or more search results from the first set of search results and (2) one or more search results from the second set of search results; and
   storing the search results page on a volatile or non-volatile computer-readable storage medium;
   wherein the set of listings on the web site are user-searchable via user submission of queries through a user interface specifically for a second vertical of the search engine.

2. The computer-implemented method of claim 1, wherein generating the search results page comprises generating a web page that contains a graphical feature that appears to be a paper note that contains one or more search results from the second set of search results.

3. The computer-implemented method of claim 2, wherein the step of generating the web page that contains the graphical feature that appears to be the paper note comprises generating a graphical feature that appears to be a paper note that contains a user-selectable control which, when selected by a user, will cause one or more search results contained within the graphical feature, but no search results that are not contained within the graphical feature, to be saved to an Internet-accessible repository that is associated with a specified user account.

4. The computer-implemented method of claim 2, wherein the step of generating the web page that contains the graphical feature that appears to be the paper note comprises generating a graphical feature that appears to be a paper note that contains a user-selectable control which, when selected by a user, will cause one or more search results contained within the graphical feature, but no search results that are not contained within the graphical feature, to be sent in an e-mail message to a specified e-mail address.

5. The computer-implemented method of claim 2, wherein the step of generating the web page that contains the graphical feature that appears to be the paper note comprises generating a graphical feature that appears to be a paper note that contains a user-selectable control which, when selected by a user, will cause one or more search results contained within the graphical feature, but no search results that are not contained within the graphical feature, to be sent in an SMS message to a mobile device that is associated with a specified telephone number.

6. The computer-implemented method of claim 2, wherein the step of generating the web page that contains the graphical feature that appears to be the paper note comprises generating a graphical feature that appears to be a paper note that contains a user-selectable control which, when selected by a user, will cause one or more search results contained within the graphical feature, but no search results that are not contained within the graphical feature, to be printed on one or more sheets of physical media.

7. A non-transitory computer-readable storage medium storing one or more instructions which, when executed by one or more processors, cause the one or more processors to perform steps comprising:
   receiving one or more query terms through a search engine interface;
   determining, by a first party, a first set of search results that are both (a) indexed in a first vertical and (b) relevant to the one or more query terms;
   based on a legal agreement entered into between (a) the first party that is associated with a search engine that determines the first set of search results and (b) a second party that owns a web site that comprises a set of listings submitted to the web site by various users other than the second party over the Internet, receiving, by the first party, the set of listings
   determining, by the first party, a second set of search results at least in part by determining one or more listings, from the set of listings, that are relevant to the one or more query terms;
   wherein the determining a second set of search results includes ranking, by the first party, the one or more listings based on the one or more query terms;
   generating a search results page that contains both (1) one or more search results from the first set of search results and (2) one or more search results from the second set of search results; and
   storing the search results page on a volatile or non-volatile computer-readable storage medium;
   wherein the set of listings on the web site are user-searchable via user submission of queries through a user interface specifically for a second vertical of the search engine.

8. The computer-readable medium of claim 7, wherein generating the search results page comprises generating a web page that contains a graphical feature that appears to be a paper note that contains one or more search results from the second set of search results.

9. The computer-readable medium of claim 8, wherein the step of generating the web page that contains the graphical feature that appears to be the paper note comprises generating a graphical feature that appears to be a paper note that contains a user-selectable control which, when selected by a user, will cause one or more search results contained within the graphical feature, but no search results that are not contained within the graphical feature, to be saved to an Internet-accessible repository that is associated with a specified user account.

10. The computer-readable medium of claim 8, wherein the step of generating the web page that contains the graphical feature that appears to be the paper note comprises generating a graphical feature that appears to be a paper note that contains a user-selectable control which, when selected by a user, will cause one or more search results contained within the graphical feature, but no search results that are not contained within the graphical feature, to be sent in an e-mail message to a specified e-mail address.

11. The computer-readable medium of claim 8, wherein the step of generating the web page that contains the graphical feature that appears to be the paper note comprises generating a graphical feature that appears to be a paper note that contains a user-selectable control which, when selected by a user, will cause one or more search results contained within the graphical feature, but no search results that are not contained within the graphical feature, to be sent in an SMS message to a mobile device that is associated with a specified telephone number.

12. The computer-readable medium of claim 8, wherein the step of generating the web page that contains the graphical feature that appears to be the paper note comprises generating a graphical feature that appears to be a paper note that contains a user-selectable control which, when selected by a user, will cause one or more search results contained within the graphical feature, but no search results that are not contained within the graphical feature, to be printed on one or more sheets of physical media.

* * * * *